United States Patent
Garrett

[11] 3,918,916
[45] Nov. 11, 1975

[54] PLURAL CHAMBER SERIAL FLOW FORCED AIR COOLED CRYSTALLIZER

[75] Inventor: Donald E. Garrett, Claremont, Calif.

[73] Assignee: Donald E. Garrett, Claremont, Calif.

[22] Filed: July 10, 1974

[21] Appl. No.: 487,287

Related U.S. Application Data

[60] Continuation-in-part of Ser. No. 246,396, April 21, 1972, abandoned, which is a division of Ser. No. 726,149, May 2, 1968, abandoned.

[52] U.S. Cl. .............. 23/273 MT; 23/302; 23/303; 159/13 C; 159/15; 159/27 B; 159/45; 261/108; 261/111; 261/148; 299/5

[51] Int. Cl.² .............. B01D 9/02; C01D 3/08

[58] Field of Search ........... 159/27 B, 15, 13 C, 45; 23/273 MT, 273 R, 303, 297, 298, 299, 302, 303; 261/108, 111, 151, 156, 147, 148; 299/5

[56] References Cited
UNITED STATES PATENTS

| | | | |
|---|---|---|---|
| 1,028,738 | 6/1942 | Kestner | 159/27 B |
| 1,237,962 | 8/1917 | Serailian | 159/27 B |
| 1,378,716 | 5/1921 | Nielsen | 159/15 |
| 2,375,922 | 5/1945 | Jeremiassen | 23/273 R |
| 2,444,527 | 7/1948 | Pomeroy | 159/13 C |
| 2,767,806 | 10/1956 | Blake | 261/111 |
| 3,442,494 | 5/1969 | Engalitcheff | 261/111 |
| 3,522,018 | 7/1970 | Bachmann | 261/148 |
| 3,799,512 | 3/1974 | Roybon | 261/111 |

FOREIGN PATENTS OR APPLICATIONS

| | | | |
|---|---|---|---|
| 172,335 | 8/1952 | Austria | 23/273 MT |
| 309,953 | 9/1968 | U.S.S.R. | 23/273 MT |
| 254,476 | 3/1970 | U.S.S.R. | 23/273 MT |
| 284,696 | 6/1915 | Germany | 23/273 MT |

*Primary Examiner* — Jack Sofer
*Assistant Examiner* — S. J. Emery
*Attorney, Agent, or Firm* — Christie, Parker & Hale

[57] ABSTRACT

Crystallization of soluble salts such as potassium chloride from a solution of potassium chloride and sodium chloride by means of multiple unit heat exchange and refrigerative crystallizers which cool the brine solution to a temperature of about −10°F. More specifically, the brine solution is cooled by a heat exchange crystallizer to provide a soluble salt or potassium chloride slurry, the slurry then being cooled in a refrigerative crystallizer to effect additional crystallization of the potassium chloride. Salt is rejected by discarding the cooled, heat exchange brine, or through the crystallization and removal of NaCl·H₂O.

6 Claims, 7 Drawing Figures

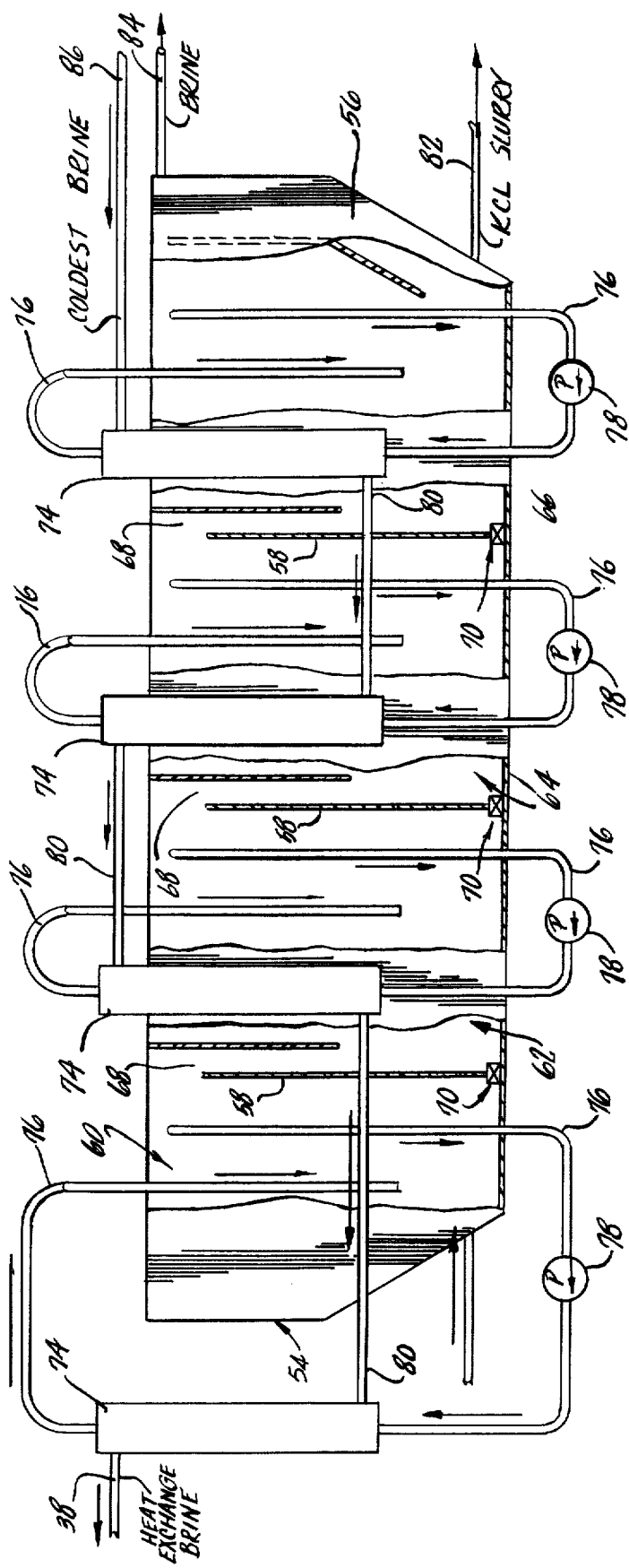
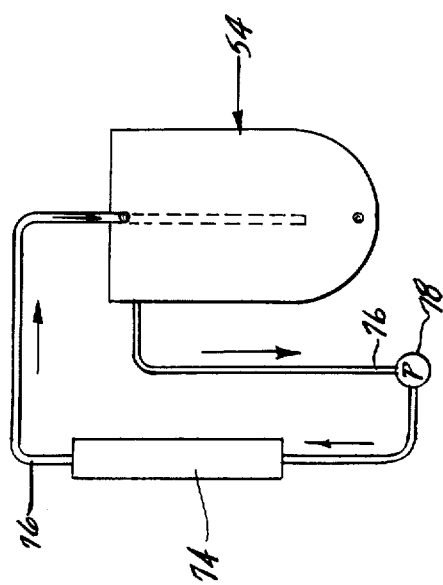
Fig. 2.
Fig. 3.

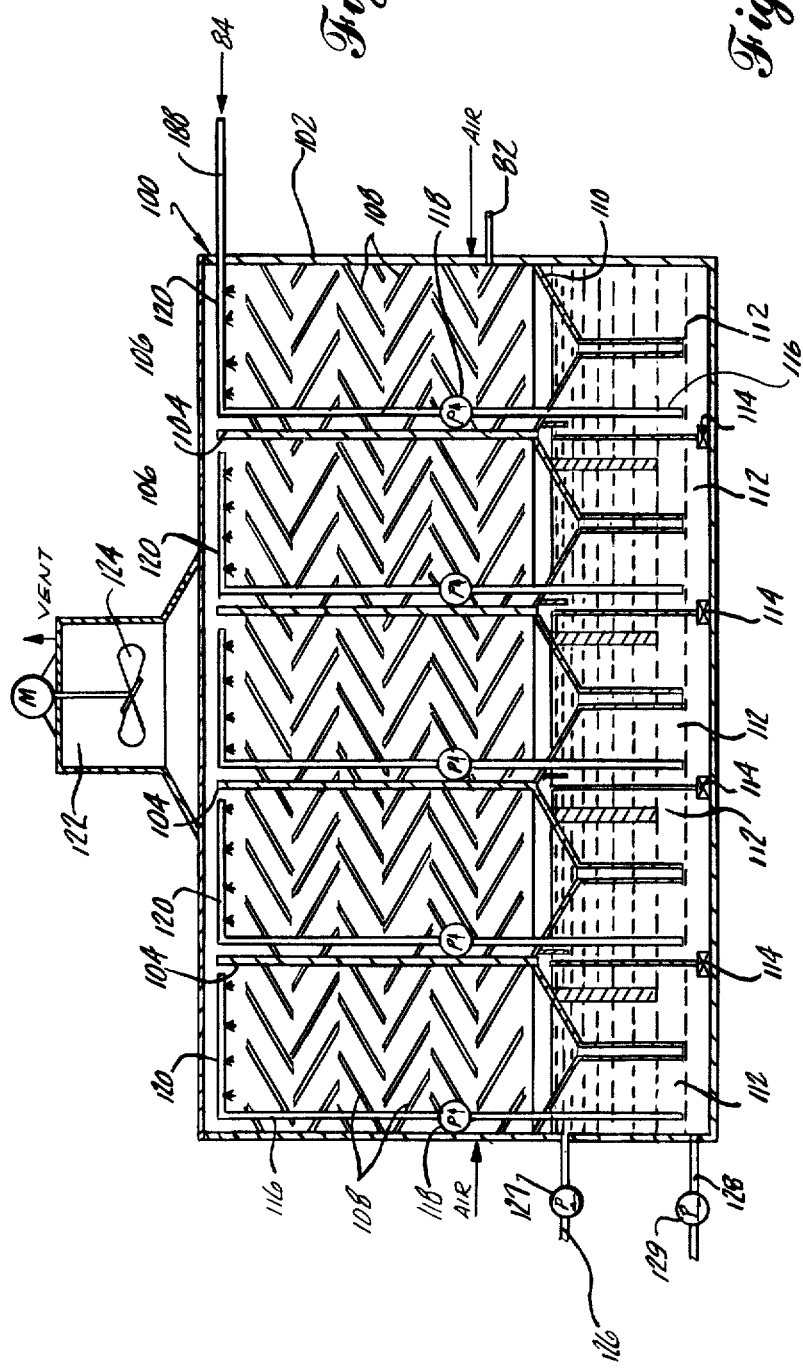
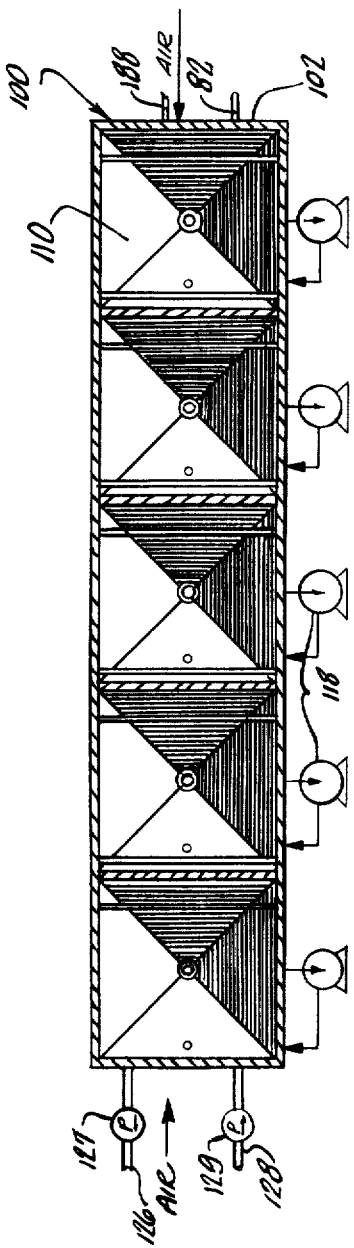

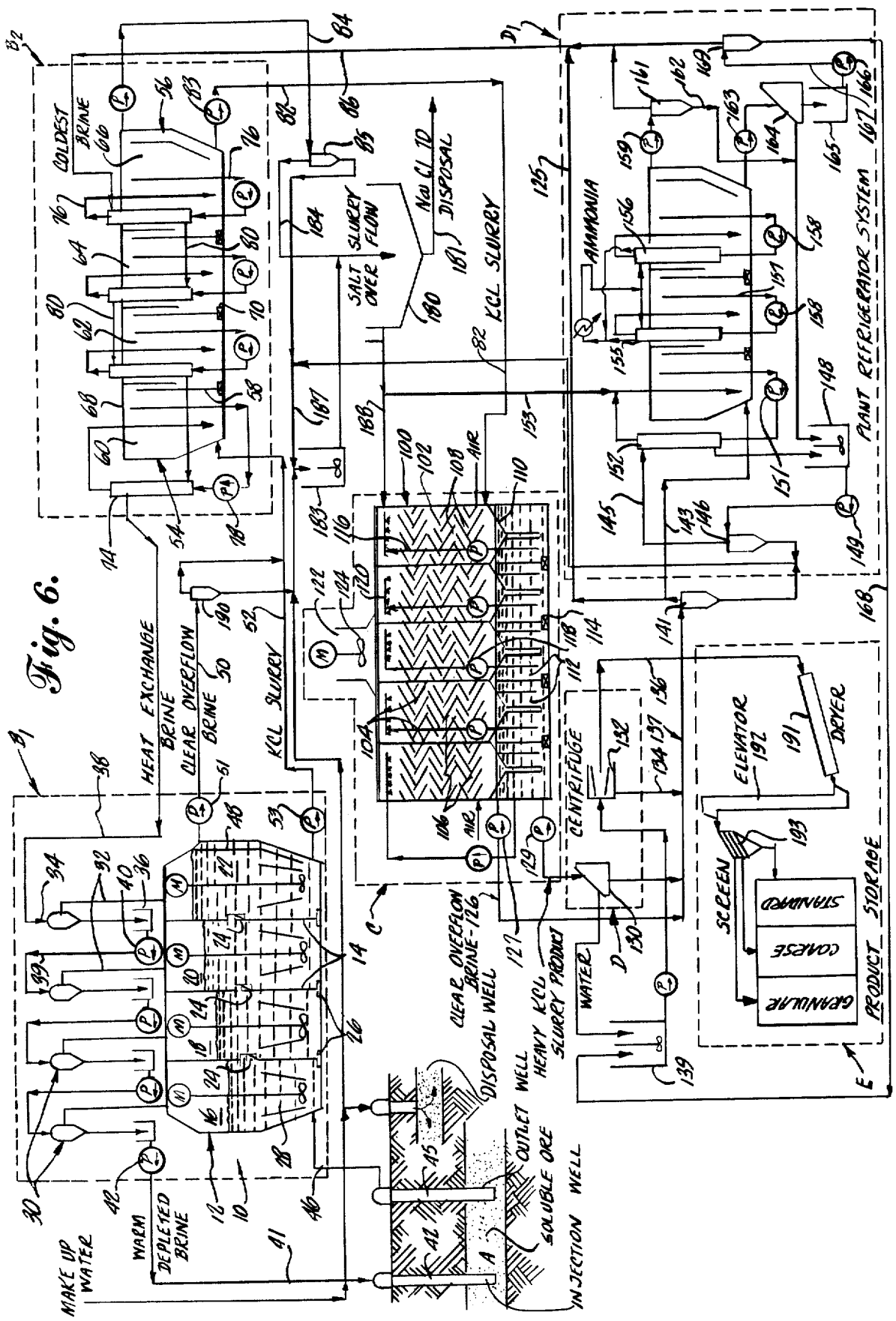

PLURAL CHAMBER SERIAL FLOW FORCED AIR COOLED CRYSTALLIZER

CROSS REFERENCE TO RELATED APPLICATIONS

This is a continuation-in-part of my application Serial No. 246,396 filed April 21, 1972, now abandoned, which is a division of my application Ser. No. 726,149 filed May 2, 1968, now abandoned.

BACKGROUND OF THE INVENTION

This invention relates generally to the production of soluble salts, including potash, and minerals such as potassium chloride, potassium sulfate, carnallite, soda ash, trona, salt, and the like.

More particularly, the invention relates to an improved method of recovering potassium chloride from a brine solution containing potassium chloride and sodium chloride.

Among the sources of potash are subterranean ores such as sylvinite (a mixture of potassium chloride and sodium chloride), carnallite, kainite, langbeinite, and other salts. Some deposits have been discovered at relatively shallow depths, such that the potash ores can be recovered by conventional shaft mining procedures. However, many potentially valuable potash deposits are known to exist at considerably greater depths which preclude the use of shaft mining procedures owing to economic and/or safety considerations. For this reason much effort has been expended to develop a positive and economically feasible method of solution mining such inaccessible deposits.

Generally speaking, solution mining of a soluble salt deposit involves initial drilling of one or more well bores into the deposit, subsequent circulation of an aqueous solution from the surface to the deposit and back to the surface through the same well bore, or through a channel or channels between spaced well bores, in such a way that some of the potash contained in the deposit is dissolved in the solution, and final processing of the returning potassiumrich brine at the surface to recover potassium chloride or other minerals therefrom. According to one solution mining practice, some of the brine, after removal of part of its potash content, may be recirculated back to the ore deposit. In an alternative method, the dissolving fluid is all or mainly water.

In some cases, as just noted, the solution is fed to and returned from the ore deposit through the same well bore. In other cases, at least two, and often several, well bore holes may be drilled and the solution is circulated in such a manner that it enters the deposit through one or more of the bores and returns through the remaining bore or bores. In either case, a suitable solution flow path, or flow paths, through the ore deposit must exist or be created. Various techniques have been devised for producing such flow paths. For example, one technique used in mining sodium chloride, involves hydraulic fracturing of the ore deposit. Since such hydraulic fracturing technique, as well as the others, are well known in the art, they will not be treated in detail here.

A variety of processing techniques for recovering the potash at the surface from solution mined subterranean potash ore deposits have been developed. However, these existing techniques are subject to certain economic and/or practical limitations which have resulted in high cost and limited their use in large commercial operations. One of the deficiencies of the existing solution mining procedures, for example, resides in the fact that they require the leaching of substantial quantities of sodium chloride as well as potash from the ore deposit. This in turn creates the necessity of removing the dissolved salt (NaCl) at the surface. Crystallization of the dissolved salt is commonly accomplished in multiple effect evaporators which are costly both to fabricate and to operate. The capital and operating costs of such evaporators are often so high as to make the total production costs involved in solution mining substantially higher than the cost of direct or shaft mining. To discard a directly cooled brine at the temperature previously considered for sodium chloride rejection would almost always result in an uneconomically high potassium chloride loss.

Present solution mining techniques have other disadvantages. One procedure, for example, involves dissolving potassium chloride and sodium chloride components from the ore deposit in approximately the same proportion, by weight, as such components exist in the deposit. This dissolution procedure requires circulation through the cavity of a mining solution whose degree of unsaturation with respect to both potassium chloride and sodium chloride is accurately controlled in such a way as to effect such nonselective dissolution of these salts from the ore deposit. There is thus required a knowledge of the relative concentrations of potassium chloride and sodium chloride in the ore deposit, which knowledge is often difficult or impossible to obtain. Alternatively, an excess of sodium chloride must be dissolved in order to be certain that all of the sodium chloride is dissolved from the portion of the deposit which yielded the potassium chloride that is removed. Removing either the exact amount or an excess of sodium chloride, plus accurately controlling the dissolving solution, is quite costly.

U.S. Pat. No. 3,058,729 which relates to nonselective solution mining and is thus subject to the disadvantages discussed in the above paragraph, discloses the direct cooling of potash brine from a solution mining well in order to crystallize and recover potassium chloride therefrom. The method is generally restricted to the use of cooling ponds and temperatures above 10°C., preferably within the range of from 30°C. to 40°C. The rejection of cold brine for sodium chloride control, in accordance with the teachings of such patent, often results in an uneconomical loss of potassium chloride, which is concurrently rejected.

The above and other deficiencies of the existing solution mining procedures, coupled with a lack of flexibility and capacity-expansion capability of the processing and recovery equipment, have severely limited the practice of solution mining.

STATEMENT OF THE INVENTION

This invention provides an improved method for the solution mining of potash ores from subterranean deposits, which method contemplates the utilization of a two stage crystallizing procedure wherein brine solution is cooled in a heat exchange zone and then crystallized by further cooling, preferably in a refrigerative crystallizer. Depleted brine solution, formed during the potassium chloride crystallization is utilized as the cooling fluid in the heat exchange operation, after which it can be employed in dissolving additional salts from the ore deposit.

Additionally, novel multiple stage, growth-type, heat exchange and atmospheric cooling crystallizers are herein provided for carrying out the process of this invention. Potassium chloride slurry, formed by means of the heat exchange treatment, is cooled in the atmospheric crystallizers by sensible heat exchange with atmosphere having a temperature of less than about 35°F., whereby potassium chloride is crystallized from the slurry.

The process is especially well-suited for application to the selective mining of potassium chloride. Magnesium chloride may be employed in the mining solution to regulate the solubility of sodium chloride in such a way as to aid in the selective extraction of potassium chloride from the ore being mined.

The method represents an extremely valuable process for recovering subterranean potash ores since it provides a solution mining operation which is relatively simple, requires a minimum use of utilities, involves a small original cost, and results in a substantial improvement in overall operating economy.

The recovery of potash as herein described may be characterized as a low temperature cooling process. The invention will be described as it is applied to the solution mining of potash, particularly potassium chloride. The process, however, is not limited to potassium chloride recovery.

It has been found that if cooling can be obtained to very low temperatures, preferably within a range of about −10°F. to 0°F., the brine obtained in solution mining of higher grade ore bodies can be economically processed by cooling alone, permitting brine rejection for sodium chloride control with minimal loss of potassium chloride. It has also been found that in areas such as Canada, where cold winters occur, this cooling can be readily obtained by a novel atmospheric crystallizer, as described below. When such atmospheric crystallizer is combined with sufficient heat exchange of the cold-to-warm brine, such as that provided by the novel heat exchange crystallizer described below, the potash depleted brine can be discarded to achieve sodium chloride rejection with unusually favorable economics.

The low temperatures required in carrying out the process of this invention can be readily obtained, during any season and in any geographical area, by means of conventional refrigerative crystallizers. Such equipment usually includes a heat exchange unit, a cooling unit, and pump means for circulating a cooling substance, such as freon or ammonia gas, through the mining solution. Ordinarily, apparatus is used which allows indirect heat exchange between the cooling substance and the mining solution.

It has also been found that for ore bodies of relatively lower thickness, or where underground solution mining methods do not allow semi-selective potassium chloride leaching for part or all of the ore body, the low temperature process of this invention provides an economically favorable basis for further salt rejection. The latter may be brought about by further plant (refrigerative) cooling to insure constant low temperatures or to crystallize sodium chloride dihydrate ($NaCl.2H_2O$), or even to crystallize ice with the salt and potash. Relatively simple phase separation procedures can be used to separate the potash from the sodium chloride, $NaCl.2H_2O$, or ice. Considering the very low heat of crystallization of these materials, and the low cost of the equipment that is required, this method is quite economical compared to the evaporation method. The low temperature process can also be combined with a solvent salting-out operation of either the sodium chloride or potassium chloride. The use of a solar evaporation step likewise can fit in quite well with the low temperature process in a favorable location, since salt can be deposited in the ponds without potassium chloride crystallization. When concentrated, the nearly saturated potassium chloride brine can be returned to the crystallizer circuit. With any of the above combinations, the low temperature cooling process of this invention can bring about unusual economies.

According to the present invention, at least one and preferably several well bores are drilled into the potash deposit to be mined. When two or more well bores are employed, they are connected by a hydraulically produced fracture, connected bottom-cut cavities, or other means. An aqueous solution is circulated through the deposit in such a way that the solution remains at, or reaches, the ore body temperature. Alternatively, the solution is purposely made warmer than the ore body. In each case the temperatures of the solution is higher than the surface air temperature. The solution dissolves potash from the deposit. The warm potash brine emerging from the deposit is then conveyed through various crystallizers, as hereinafter described, to recover the potassium chloride or other salt. For convenience in the ensuing description, it is assumed that the solution is fed to the deposit through a first well bore, hereinafter referred to as the inlet bore, and emerges from the deposits through a second well bore, hereinafter referred to as the discharge bore. As noted earlier, however, the invention may be practiced with other than two well bores, as by utilizing the solution cavity method of solution mining with a single well bore. With two or more wells the brine flow paths may be produced by hydraulically fracturing the potash deposit between an inlet bore and a discharge bore, or by connecting two single cavities, which are so spaced that the solution mining brine remains in contact with the ore deposit for a sufficient period of time to become essentially saturated with the potassium chloride and with sodium chloride, or dissolves the desired ratio of salt to potash, and reaches the temperature of the ore deposit. The potassium chloride rich brine then returns through the discharge well bore to the surface, where the brine is processed to recover potassium chloride and the brine is returned to the ore deposit. By such mining, a portion, or in some cases, most of the sodium chloride may be left in the ore body.

It is a feature of this invention that a sufficiently high brine velocity and/or insulation or heating in the return brine well casing is utilized to allow the brine to reach the surface at essentially its ore zone temperature in order to prevent crystallization of potassium chloride in the well bore. After processing, part or occasionally all of the cooled, potash depleted, brine is diluted and sent to the potash deposit through the inlet well bore to dissolve more potassium chloride and some sodium chloride.

When a great deal of salt is to be rejected by cooling alone, the mining solution can be water or a dilute salt solution, or the liquid may consist of an unsaturated sodium, potassium, and magnesium chloride ($MgCl_2$) brine. The magnesium chloride, ordinarily in amounts of less than about 20 moles per 1,000 moles of brine, is employed as a control agent to regulate the solubility of sodium chloride in the mining solution in such a way as to aid in the selective extraction or dissolution of potassium chloride from the ore bodies. Thus, it has been found that by maintaining the magnesium chloride concentration of the solution at a suitable level, as depicted in FIG. 7, the sodium chloride solubility remains essentially constant in a temperature range of from 5°C. to above 80°C. Accordingly, if the solution or brine is returned to the potash deposit with the proper magnesium chloride and salt concentration, the brine will selectively dissolve potassium chloride, and will not precipitate sodium chloride in the pores of the deposit, thus preventing the blocking of the flow. With the normal large crystal size of the potash and depending upon the percentage of potash present, a variable amount of salt will need to be dissolved to keep the formation completely free and porous, or to allow some salt to fall to the floor of the deposit and thus keeping the potash exposed. Brine with a high magnesium chloride content minimizes the need for total salt dissolution. However, in the case of solution mining between two holes, it is not necessary to dissolve all the sodium chloride regardless of the composition of the dissolving brine, and even in the absence of magnesium chloride in the brine.

There is also provided in accordance with this invention a multi-cell apparatus for crystallizing potassium chloride from a solution of potassium chloride and sodium chloride and preferably for promoting the crystallization and growth of potassium chloride crystals in a slurry of potassium crystals.

The apparatus consists of a housing which defines a plurality of cooling chambers through which a potassium chloride solution and/or slurry is passed. Each chamber has at least one air permeable wall above an isolated setting zone to form crystals of potassium chloride. Within the cooling chamber there is contained a plurality of fixed baffles over which the solution or slurry is passed countercurrently to fan induced air flow. Cooling occurs by sensible heat exchange with air. The baffles promote crystal growth. Below each cooling chamber is a receptacle substantially isolated from a flow which receives the cooled solution or slurry. Controlled growth of potassium chloride crystals occurs on a said heat of potassium chloride crystals. A pump is provided for passing or recirculating the solution and/or slurry through the cooling chamber and into the crystallizing receptacles. Where multi-units are used in series, a slurry density can be progressively increased by passing the solution and/or slurry between cells of a series.

This crystallizer may be operated in conjunction with heat exchange crystallizers which consists of a housing containing a plurality of upright crystallizing chambers having a lower crystal settling area and means to communicate with adjacent chambers. A heat exchanger is disposed adjacent to each chamber and contains inner heat exchange through which a salt solution or slurry to be cooled is passed. A cooling fluid is passed around the tubes. Each chamber is provided with a pump for circulating a salt solution or slurry from the crystallizing chamber through the heat exchanger and back to the crystallizing chamber, as well as a pump to circulate the cooling fluid through the shells of the heat exchangers.

BRIEF DESCRIPTION OF THE DRAWINGS

FIGS. 2 and 3 show a side and end view of a heat exchange crystallizer of this invention;

FIGS. 4 and 5 show a side and bottom view of a multi-unit atmospheric crystallizer of this invention;

FIG. 6 is a process flow diagram depicting a preferred practice of the invention, using the multi-unit heat exchange and atmospheric crystallizers described in FIGS. 2–5.

DESCRIPTION OF THE PREFERRED EMBODIMENTS

Figure 1:
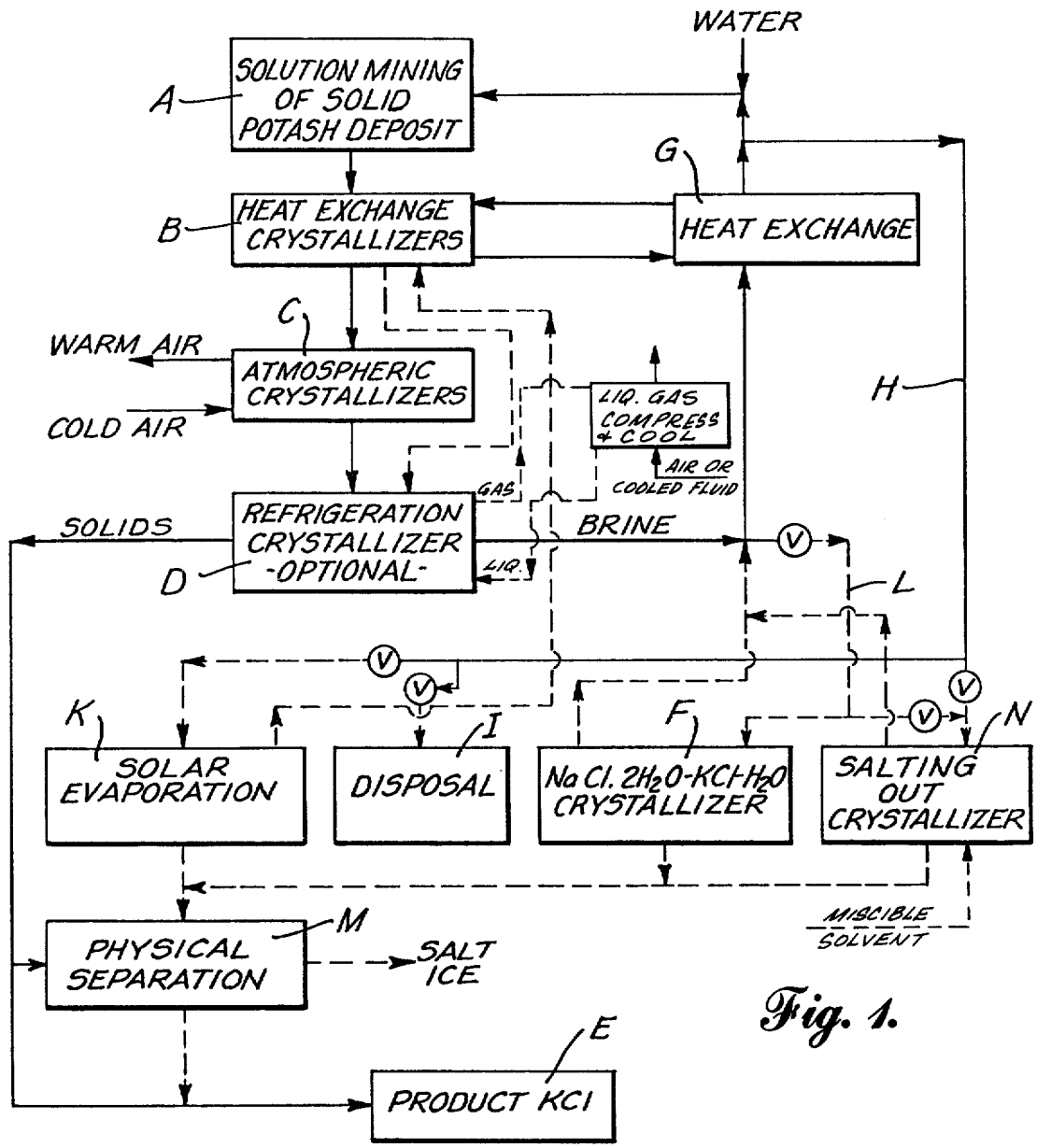
FIG. 1 diagrammatically illustrates this solution mining procedure as well as an overall solution mining system according to the invention.

Reference is now made to FIG. 1 which diagrammatically illustrates the successive process steps to which the solution mining brine from a solid potash deposit can be subjected according to this invention for the purpose of recovering its potassium chlroide content. In this figure, the potash deposit being mined is diagrammatically illustrated at A. The relatively warm potassium chloride-rich solution emerging from the ore deposit A through the discharge well bore is conveyed to a heat exchange crystallizing station B where there is produced a slurry containing relatively large crystals of potassium chloride. As will appear presently, the initial crystallizing station B may comprise various types of crystallizers. Preferably, however, the crystallizers employed at this station are of the so-called multiple unit heat exchange crystallizers described below. The brine solution is preferably cooled in the heat exchangers to a temperature within a range of from −5°F. to 30°F.; cooling to a temperature of about 0°F. being especially preferred.

The partially cooled brine or potassium chloride slurry from crystallizing station B is then conveyed to station C for final cooling and crystallization of the potassium chloride. This crystallizing station can utilize a refrigerative crystallizer or a multiple stage, growth-type atmospheric crystallizer such as described below. The potassium chloride slurry is preferably cooled in a refrigerative crystallizer to a temperature within a range of from the eutectic point of ice, about −10°F., to 0°F. The atmospheric crystallizer can be employed at air temperatures of less than about 35°F.

Particularly favorable results are obtained using multiple unit heat exchange crystallizers which effect cooling of the brine solution to a temperature within 1°F. to 30°F. of its initial temperature. That is, the depleted brine solution used to cool the brine solution emerging from the well is preferably heated to a temperature within about 1°F. to 30°F. of the temperature of the well brine solution. Thus, the depleted brine solution, after such heating, can be employed to dissolve additional salts from the ore deposit directly, or further heated, if desired.

The final crystallizing station D, if it is desired to be employed, can be a refrigerative crystallizer. Following this is the dewatering equipment, such as a centrifuge or other suitable device for separating the potash crystals from the brine, which together constitute the potassium-rich slurry emerging from the crystallizers. The debrined potash crystals are conveyed to a suitable drying and storage facility E. The brine separated at station D is conveyed either to a eutectic ice-sodium chloride dihydrate-potassium chloride crystallization station F, or directly to a heat exchange station G for cooling, in the manner hereinafter described. The potash-rich brine enters the initial crystallizing station B from the potash ore deposit A. The brine emerging from the heat exchange station G is then returned to the ore deposit A to dissolve more potassium chloride, or is discarded through a bleed line H to disposal well I or solar evaporation ponds K. A salting-out station N can be used to treat either the cold or the heat exchanged potash depleted brine.

The bleed line H is utilized as a means for maintaining the proper sodium chloride concentration in the recycle brine to allow proper potash exposure in the cavity by discarding the sodium chloride that was dissolved with the potash. When magnesium chloride is employed in the dissolving brine, the bleed line H is employed in like manner to control the concentration of magnesium chloride in the brine. With the hydraulic fracturing procedure, or a comparable connected cavity, or bottom-cut mining operation, and less than about 70% potash in the ore body, it will usually be necessary to dissolve some sodium chloride with the potassium chloride to obtain a reasonably complete recovery of potassium chloride. With a typical Canadian average ore body containing about 33% potassium chloride, a ratio of 1:1, by weight, of sodium chloride to potassium chloride dissolved results in two-thirds of the ore body being dissolved, including substantially all of the potassium chloride. This allows good brine circulation and potassium chloride exposure in a hydraulic fracturing or similar solution mining operation. Rejection of an amount of sodium chloride from the brine to permit dissolution in such 1:1 ratio is desirable before returning the brine to the ore deposit. In some cases all of the brine is rejected, and water is returned to the cavity.

Such rejection of sodium chloride from the brine is accomplished in various ways. For example, the proper volume of brine is bled from the system through the bleed line H, after which the remaining brine is diluted with fresh water. Such direct disposal of the cold brine results in acceptably low loss of the potassium chloride extracted from the ore body at low terminal temperatures, if the ore body is sufficiently rich. Such potassium chloride loss is economically acceptable for most connected well mining operations during winter operations, or operations employing plant refrigeration cooling.

In regard to such brine disposal, it will be observed in FIG. 1, that the brine resulting from the potassium chloride-brine separating station D, can be conveyed to the disposal wells I or to solar evaporation ponds K from the heat exchange station G directly after removal from the dewatering station D, or after having passed through line L and the sodium chloride-water crystallizing station F. It has been found that in relatively cold climates rejection of the required sodium chloride from the brine can be accomplished during the two or three coldest months of the year, which incidentally correspond to the desired peak production period. Alternatively, some sodium chloride rejection can be accomplished by crystallizing sodium chloride dihydrate (commonly represented as $NaCl.2H_2O$) with the potassium chloride, and perhaps with water (ice) at the crystallizing station F. The resulting slurry can then be conveyed to a gravity, particle size, or flotation "physical separation" station M in which the potassium chloride is separated by known means (the $NaCl.2H_2O$ crystal is usually larger than KCl), and then conveyed to the drying storage facility E. The potash and salt fractions can be given a warm water or brine leach to increase product purity, and decrease potassium chloride loss, and the residue sodium chloride then discarded.

The liquor bleed, necessary for sodium chloride control, can also be stored temporarily in large reservoirs, ponds or porous underground formations, and subsequently conveyed to the potash, or sodium chloride dihydrate crystallizers during the coldest periods. Alternatively, in warmer periods, such liquor bleed can be sent to solar evaporation ponds K for solar evaporation and sodium chloride crystallization. The crystallized sodium chloride produced in these solar ponds may be periodically dissolved and disposed of or, if potassium chloride crystallization is desired, harvested by known practices and subsequently processed by known flotation procedures to yield a salable potassium chloride product. This same solar evaporation process may also be used for sodium chloride control in colder climates but will necessarily be restricted to the summer months. As a final means of sodium chloride rejection, a salting out system N, employing an organic solvent, can be used.

Control of the sodium chloride dissolved from the ore, and the sodium chloride content of the recycled brine, is accomplished by bleeding brine from the system and by the addition of water to reduce the sodium chloride level in the remaining brine prior to its reinjection into the ore body. The sodium chloride content of the brine can also be controlled through other low-temperature removal methods. The stream of brine which is bled from the system to effect sodium chloride control can be subjected to additional crystallizing action to recover its potassium chloride content.

The invention as described above has obvious cost and efficiency advantages over presently known processes, and avoids one serious problem of the prior art potash recovery techniques. The problem referred to is the conventional requirement that crystallizers operate in a steady manner under constant operating conditions. In accordance with this invention, however, crystallizers can be made to perform very satisfactorily under cyclic day-night, and seasonal temperature conditions which change the temperatures in the circuit and consequently alter either the potash production rate or the amount of brine flow required from the solution mining wells. It has been found, for example, that if the number of crystallizer stages, and thus the $\Delta T$, or the crystallization potential per stage, is adequate for the coldest ambient air conditions, it will be equally adequate for any warmer temperatures.

In like manner, the circulation rate and the solids residence time within the crystallizer must be adequate for the most severe conditions. The upward flow, or classifying velocity in the crystallizer's settling compartment must be somewhat variable in order to accommodate variable liquor velocities, and all pumps, centrifuges, cyclones, etc., must be able to operate over a reasonable range of capacities.

To adequately fulfill the above mentioned requirements, and to do so most economically, it has been found that multiple stage, growth-type crystallizers are especially advantageous. Schematically shown in FIGS. 2–5 is the preferred equipment. The large number of stages in the multi-stage crystallizers helps to insure a low enough $\Delta T$ per stage to accommodate variable operating conditions, minimize tube fouling in cooling heat exchangers, and give a high energy and yield efficiency notwithstanding the relatively small differences between ambient air and brine temperatures that are sometimes available. It has also been found that day-night and even storm caused variable conditions affect the multi-stage crystallizers to only a small degree.

Another embodiment of this invention is the addition of plant refrigeration in order to crystallize the KCl-NaCl.2H$_2$O—ice eutectic mixture until the desired amount of sodium chloride had been rejected. Crystallizers used for this purpose can be either of the heat exchanger, or direct refrigerant injection type. The ice floats on the surface of the crystallizer or separation chamber and can be skimmed off. The NaCl.2H$_2$O can be made to grow into much larger crystals than the KCl, and most of its may be separated by screens, cyclones, etc., from the potash. Upon heating past the transition temperature, any remaining NaCl2H$_2$O crystals are converted to very small crystals, and thus can also be mechanically separated from the larger potassium chloride crystals. The water and sodium chloride dihydrate can be employed either separately or together to cool the incoming brine.

Another embodiment for obtaining more complete potash recovery is the addition of a step which involves the use of "salting-out" miscible solvents. When low molecular weight compounds, such as methanol, are added to the cold, partially potash-depleted brine, potassium chloride solubility is selectively reduced. The salt brine, after heat exchange and solvent recovery can then be discarded with very little potash loss. When higher molecular weight solvents, such as butanol, are added to the partially potash depleted brine, sodium chloride solubility is selectively reduced. Impurities such as magnesium chloride can be controlled by bleeding brine from the system before the salting-out treatment.

Referring to FIGS. 2 and 3, which illustrate a heat exchange crystallizer of this invention, housing 56 contains a number of vertical partitions 58 which divide the interior of the housing into separate chambers 60, 62, 64, and 66. Each partition has an upper brine overflow passage 68 and a lower slurry passage 70 for communication with adjacent chambers. Associated with each crystallizer chamber 60, 62, 64, and 66 is a heat exchanger 74. Each heat exchanger is a number of inner heat exchange tubes (not shown) which define a first flow path through the respective exchanger, and an outer shell surrounding the tubes which defines a second flow path about and disposed in heat transfer relation to the tubes. In the ensuing description, the two flow paths defined by the inner tubes and outer shell of each heat exchanger 74 will be referred to as the inner flow path and the outer flow path, respectively. Each crystallizer chamber 60, 62, 64, 66 and the inner flow paths of the corresponding heat exchanger 74 are interconnected by lines 76 and a pump 78 in such a way that brine flow occurs from each chamber to the inner flow path of the respective heat exchanger 74, to the respective pump 78, and back to the chamber. The outer flow paths of the several heat exchangers 74 are serially interconnected by lines 80 to permit cold brine flow through the several heat exchangers in successive fashion. The brine return line 38 leading to the condenser 30 is connected to one end of the outer flow path in the heat exchanger 74 for the heat exchange crystallizer chamber 60. Clarified feed brine flows over vertical partitions 58 from cell to cell and finally discharges through line 84. The thickened slurry likewise flows through the valves or screws of passages 70 from cell to cell and exits through line 82.

Referring to FIGS. 4 and 5, which show a multi-unit atmospheric crystallizer of this invention, housing 102 contains a number of vertical partitions 104 defining intervening atmospheric cooling chambers 106. Within each chamber are a multiplicity of inclined fixed louvres or baffles 108 and a lower hollow-shaped drip pan 110. Above the levels of the drip pans 110, the side wall of the housing 102 and the partitions 104 are of louvre or like construction and are permeable to air. Below the levels of the drip pans, the side walls and partitions are solid and define settling tanks 112 at the lower ends of the cooling chambers. The contents of settling tanks 112 are the adjacent settling tanks the communicate through openings or valves 114 in the partitions. Extending from each settling tank to the top of the corresponding cooling chamber 106 is a brine (solution) or slurry of salt crystals, e.g. potassium chloride crystals isolated from the entering flow of cooling air by drip pans 110 recirculating line 116 containing a pump 118. The upper end of each slurry recirculating line connects to a number of downwardly opening spray nozzles 120. In the upper end of the housing 102 is an air exhaust opening 122 containing an exhaust fan or blower 124 actuated by motor M. Operation of this blower induces air flow upwardly through the cooling chambers 106 to the exhaust opening 122. The solution or slurry of salt crystals is recirculated through the cooling chambers by operating the pumps 118 which withdraw brine (solution) and/or slurry of salt crystals from the settling tanks 112 and to discharge the brine and/or slurry through the upper spray nozzles 120. The brine then flows downwardly by gravity over the baffles 108, back to the settling tanks 112 in countercurrent to the flow of air circulating upwardly through the chambers. In the preferred operation of the atmospheric crystallizer, the slurry of salt crystals are passed over fixed baffles 108. In the case of potassium chloride, this materially enhances the growth of large crystals of potassium chloride which aids its separation from sodium chloride crystals by particle size differential, and prevents fouling of the baffles. High crystal concentrations or slurry densities are particularly preferred.

The solution or slurry passed over the baffles of a single unit can be recirculated from within the unit itself or from the next preceding unit of a series as for instance, by the flow of a concentrated slurry as an underflow through openings or valves 114. In this operation, slurry density can be progressively increased from cell to cell. Preferably, however, the slurry comes from the settling tank 112 of a give cell.

It is also desirable that a cell have a classification zone for control of slurry density as for instance, by means of a baffle located within each settling chamber 112 which provides an active zone for recirculating a dense slurry and a quiescent settling zone where crystal growth is promoted.

The slurry and brine overflow lines 82, 84 leading from the heat exchange crystallizer station B$_2$ to the atmospheric crystallizing station C connect, respectively, to the lower portion of atmospheric crystallizer 102 and the upper spray nozzles 120 in one of the cooling chambers 106 in the atmosphere crystallizer 102. Leading from the upper portions of settling tank 112 of such cooling chamber is a brine overflow line 126 containing a pump 127. A slurry line 128 containing a pump 129, leads from the lower portion of settling tank 112 to the dewatering station D.

Referring to FIG. 6, crystallizing station $B_1$ comprises a multi-stage vacuum growth-type crystallizer 10 having a hermetic housing 12 containing a plurality of vertical partitions 14 which divide the interior of the housing into a plurality of successive separate vacuum chambers 16, 18, 20 and 22. Brine flows through the vacuum chambers progressively from left to right. Each such chamber communicates with a successive chamber through a valved brine passage 24. Successive valves are positioned at progressively increased heights as the brine flow therethrough from chamber 16 to chamber 22. Each chamber also communicates with a successive chamber through a lower valved slurry passage 26. Each chamber contains agitating means 28 for inducing circulation within the respective chamber. Associated with each vacuum chamber 16, 18, 20, 22 is a barometric condenser 30 which communicates with its respective chamber through vacuum line 32. Each condenser has a brine inlet 34 and discharges to an atmospheric receiver 36. The inlet of the condenser 30 for the chamber 22 communicates, via a brine return line 38, to the heat exchange station $B_2$. The inlet of each succeeding condenser, in the direction of the vacuum chamber 16, communicates to the receiver 36 of the preceding condenser through a brine line 39 containing a pump 40. The receiver of the condenser associated with vacuum chamber 16 communicates, via a brine injection line 41 containing a pump 42, to the inlet well bore 43 leading to the ore body A to be mined. The outlet well bore 45 leading from the ore body communicates with the bottom of the vacuum chamber 16 through a brine recovery line 46. Communicating with the bottom of the vacuum chamber 22 and rising to a position adjacent the top of the chamber is a brine overflow passage 48. A brine overflow line 50, containing a pump 51, leads from the upper end of this overflow passage to the heat exchange crystallizer $B_2$. Slurry line 52, containing a pump 53, extends from the bottom of the vacuum chamber 22 to the heat exchange crystallizer $B_2$.

The heat exchange crystallizer station $B_2$ is substantially the same as that described by FIGS. 2 and 3, the same numbering being used for the following reference to such station. Although the heat exchange crystallizers of stations $B_1$ and $B_2$ have been described in detail, it is to be understood that any such apparatus may be employed in accordance with the process of this invention, as long as initial cooling is accomplished. The specifically described crystallizers, however, have been found to yield especially advantageous results.

Slurry line 82 of station $B_2$, containing pump 83 leads from the bottom of crystallizer chamber 66 to atmosphere crystallizing station $D_1$. Bring overflow line 84 leads from the top of crystallizer chamber 66 to the salt slurry overflow vessel 180. The cold brine line 86 leads from station $D_1$ to one end of the outer flow path in the heat exchanger 74 for the chamber 66. The cold brine flows through the heat exchangers 74 successively in a direction from the heat exchanger associated with crystallizer chamber 66 to the heat exchanger associated with chamber 60, as indicated by the arrows in FIG. 6.

A salt thickener is optional, but generally worthwhile as its use provides a processing step at one or more locations in the low temperature solution mining process to aid in the rejection of salt. As shown in FIG. 6, the streams that might contain salt are: stream 50 from the heat exchanger crystallizer $B_1$, stream 84 from the heat exchanger crystallizer $B_2$, stream 137 from the cooling tower, refrigeration crystallizer, or dewatering equipment. After cycloning (190, 85, 141) or thickening, the salt is sent to a back tank 183 and hot, depleted brine 184 is contacted with it. The slurry is sent to a thickener 180. The clear overflow liquor from the thickener 180 is sent to the next crystallizer via line 188.

The atmospheric crystallizing station C comprises a multi-stage atmospheric crystallizer substantially the same as that described by FIGS. 4 and 5, the same numbers being used in the following reference to such station. It is noted that any crystallizer may be employed in this stage, as long as the potassium chloride slurry is cooled to the required temperature. Any of a number of presently available refrigerative crystallizers, for example, can be used; such equipment is often preferred due to its compact size and low original cost.

Dewatering station D comprises means, such as screen 130 and a centrifuge 132, for separating the liquid and solid components of the slurry entering the station from the atmospheric crystallizing station C. The liquid component or brine removed at the dewatering station is fed to the brine overflow line 126 through lines 134. The solid components or potash recovered at the screen is sent to a leach tank 139, and after centrifuging is conveyed to the drying and classifying station E through a line 136.

Line 136 leads to dryer 191 where the potash is dried and discharged to elevator 192 which elevates dried material to the screen means 193. The screens in this screen means classify the particles which are conveyed to bins for granular, coarse and standard size particles, respectively, through suitable connecting lines.

If refrigerative crytallization is to be used, the brine stream entering it can be that from the atmospheric crystallizer and can enter through line 143. Alternatively, if no atmospheric crystallizer is used, it can come directly from the heat exchange crystallizers and enter through line 153. As shown in this example the final stage of the plant refrigeration crystallizer employs heat exchange from the crystallized sodium dihydrate or ice that can be formed in this unit. In this cell, brine enters to the pump 151, circulates through the heat exchanger 152 and back into the body of the crystallizer. The heat exchanger is fed on its shell side from the salt melting tank 148, circulates by means of pump 149 through a cyclone 146 with the overflow liquid 145 and enters the heat exchanger 152. The underflow salt from the cyclone returns to the salt leaching tank 183 where any residual potash content that is mixed with it may be dissolved. Brine overflowing from the first stage and a slurry transferring from the first to the second stage of the refrigeration crystallizer enters one or more stages in which a refrigerant such as ammonia or a fluorinated hydrocarbon such as Freon is used to further cool the brine. The solution is circulated from each of these crystallizer stages such as through line 157 and pump 158 to the refrigerant cooled heat exchangers 155, 156, and then back into the cell. When an adequate number of refrigerated crystallizing stages have been employed, the overflow of comparatively clear brine is passed through pump 159 and into cyclone 161 where the overflow brine is then returned to the system and joins the other heat exchange brine in line 125. The underflow solids 162 are sent to the dihydrate melt tank 148 and its content is removed as previously described. The potash slurry leaves the bottom of the last cell through pump 163 through a screening or other thickening device 164 where the coarser salt dihydrate crystals are sent to the melting tank 148. The smaller potash drops into a holding tank 165, then is pumped through pump 166 and line 167 to a cyclone or other particle size separating system or thickening device 169 where the potash is returned to its leached tank 139 and the clear liquor joins the heat exchange brine leaving the system. In the potash leach tank 139 all the potash is subjected to a brief water leach so that any residual sodium chloride may be dissolved. From there it is pumped to the centrifuge 132 or other dewatering device.

In the operation of the solution mining method illustrated in FIG. 6, relatively warm potash-rich brine emerging from the outlet well bore 45 enters the vacuum crystallizer 10. The interior crystallizing stations 16, 18, 20 and 22 of this crystallizer are evacuated to a reduced pressure level which causes evaporation of the entering rich brine, and initial crystallization of potash from the brine, within the crystallizing chambers. The resulting clear overflow brine and the potash-rich slurry then pass from the vacuum crystallizer to the heat exchanger crystallizer 54 through the lines 50, 52, respectively. The overflow brine entering the heat exchanger crystallizer 54 is cooled by heat transfer with cold brine which enters the heat exchange crystallizer through the line 86. Additional crystallizing of potash from the overflow brine occurs in the heat exchange crystallizer to produce a slurry somewhat richer in potash and a clear overflow brine. This overflow brine and the potash-rich slurry flow from the heat exchange crystallizer through the lines 82, 84 respectively to the atmospheric crystallizer 100. In this latter crystallizer, the overflow brine is recirculated through the crystallizing chambers 106 and is thereby cooled by the air flow within the crystallizer, as explained earlier. Additional potash crystallization occurs within this crystallizer.

The very rich potassium chloride slurry emerging from the atmospheric crystallizer 100 enters the dewatering station D. In this station, the potash crystals are separated out and then transferred through line 136 to the station E for drying, classifying, and storage. The combined flow of depleted brine from the atmosphere crystallizer 100 and the dewatering station D may go to either of two lines, passing directly to the cold brine return line 125 or to the plant refrigerative crystallizing station $D_1$. At this latter station, the brine is further cooled to crystallize out hydrated sodium chloride ($NaCl.2H_2O$), and possibly ice. The former is returned through the line 168 to the cooling circuit, as is the latter. The cold depleted brine returning through the line 125 flows first through the circularly arranged heat exchangers 74 of the heat exchange crystallizer 54, then through the serially arranged barometric condensers 30 of the vacuum crystallizer 10, and finally through the inlet well bore 43 back to the potash deposit A. During its flow through the heat exchangers 74 of the heat exchange crystallizer 54, the cold brine cools the clear overflow brine entering the latter crystallizer from the vacuum crystallizer 10. This cooling action occurs by heat exchange between the cold brine flowing through the outer flow path of the heat exchangers 74 and the clear overflow brine or slurry which is circulated through the inner flow path of these heat exchangers, as explained earlier. Subsequent flow of the cold depleted brine to the barometric condensers 30 of the vacuum crystallizers 10 functions to evacuate the crystallizing chambers 16, 18, 20, 22 of crystallizer 10 to effect initial crystallizing of potash within these chambers, as noted earlier.

When the atmospheric crystallizers are employed, reservoirs can be used for temporary storage of reject brines having a relatively high potassium chloride content. Such brines can be recycled and reprocessed in the colder periods of the year before being ultimately rejected. During the warmer periods of the day or year, solar ponds can be used to reject salt, but not to deposit potash. Instead, the ponds concentrate brine to the point of potash saturation, and then in the cooler periods the brine is processed in the crystallizers and a portion thereof returned to the ponds for additional evaporation and salt deposition. In the winter and rainy periods much of the deposited salt can be dissolved and diposed of with the other brine.

An embodiment of this invention is the utilization of at least a partially selective potassium chloride-leach of the ore body. By initiating the leaching of the potash seam near its base, such as by hydaulically fracturing at a clay seam at the lower limit of the potash zone, sufficient sodium chloride can be dissolved with the potassium chloride to keep the cavity open and all or most of the potassium chloride exposed. However, in many potash beds, dissolving only a part of the sodium chloride with substantially all of the potassium chloride, results in a great deal of the sodium chloride falling to the floor of the channel, thus avoiding the necessity of dissolving all of the sodium chloride. This occurs in zones of high potassium chloride content (e.g.> 70% KCl), where almost no sodium chloride need be dissolved.

The process of this invention can be used to selectively dissolve potassium chloride from the ore body. Generally, not more than an equal quantity of sodium chloride will need to be dissolved. In the least favorable circumstances not more than 90% of the sodium chloride present in the ore body would have to be dissolved, but ordinarily it is only necessary to dissolve about half of the sodium chloride present.

A further part of this invention is the discovery that the potassium chloride product obtained by the practice of this invention is generally round and uniformly sized and its flow characteristics are good. It has been found that a slurry of this product when deposited within a deep salt cavern or worked-out potash area, may be stored for long periods in an easily reclaimable form. By merely repumping, perhaps with the aid of ultrasonic or other vibrations, it can be almost totally recovered from the cavern. In this manner, potash can be stored during periods when production exceeds sales, and recovered for dewatering, drying and shipping during periods of large demand.

The process of this invention also applies to those ores which because of their composition (e.g. those containing carnallite, etc.) or shallow depth, are more conveniently solution mined with a brine heated to a temperature higher than that occurring naturally in the ore body. In this case the flow rates between the hydrofractured well must be high enough, and the well spacing sufficiently close, so that excessive heat is not lost underground. The warm, saturated brine, upon being cooled at the surface to crystallize potash (or canallite etc.), may then be partially discarded or separately processed for sodium chloride and magnesium chloride control, the residual heat exchanged and terminally heated brine reinjected into the ore. In the case of carnallite ore, high magnesium chloride liquors will be present all through the cycle and a careful balance is required between the solution mining brine flow rate and temperature for the optimum economy of operation.

In a similar manner, the process of this invention is also applicable to naturally occurring brines. Shallow brines, such as those occurring in "dry lake" basins, or even impounded solar pond brines may also be processed by the method of this invention. The bleed stream from the low temperature processing may be 100%, or if there are solid phase salts present in the brine deposit, part or all of it may be reinjected into the deposit. Secondary processing may also be practiced on part or all of the brine for the recovery of other salts.

An embodiment of the process of this invention includes methods for keeping the brine at the temperature of the ore body, or of the hot solution, as it flows up the well casing. Several methods have been devised for this, including: insulating the annular area between the casing and an inner string of pipe, as with a foamed-in-place urethane or other material; heating the pipe, as with fastened-on heating elements, or by having one or more heating sections on the pipe; inserting a heating rod or jacket into the casing; mixing a hot brine with the return liquor for heating and/or dilution; by maintaining a high velocity in the return piping; or any combination of these methods.

The following examples illustrate the utilization of the described atmospheric crystallizer in carrying out the process of this invention.

EXAMPLE I

A brine solution containing very little magnesium chloride, and having a temperature of 135°F. is pumped from a potash solution mine. This brine, containing 29.4 moles of potassium chloride (represented as $K_2Cl_2$) and 43.7 moles of sodium chloride (represented as $Na_2Cl_2$) per 1,000 moles of water, is cooled by heat exchange in the heat exchange crystallizer station $B_2$ to about 14°F. and then cooled in atmospheric coolers C to about 0°F., at which temperature the brine first becomes saturated with sodium chloride, and then further cooled to −10°F. An amount of sodium chloride equivalent to one-third of the potassium chloride harvested is rejected, i.e., the amount rejected is equivalent to one-third of the difference between the potassium chloride concentration at the cold temperature of −10°F. (10.0 moles $K_2Cl_2$ per 1,000 moles of water) and the hot temperature, or 135°F. (29.4 moles $K_2Cl_2$ per 1,000 moles of water). Thus, 6.5 moles NaCl per 1,000 moles water are rejected as sodium chloride dihydrate, ($NaCl.2H_2O$). Potassium chloride and ice also crystallize in the proportion of about 15 moles of potassium chloride per 65 moles of sodium chloride dihydrate, upon cooling the brine to about −10°F. in the atmospheric crystallizer.

EXAMPLE II

The process of Example I is repeated with the modification that the brine is cooled to −10°F. and a greater amount of salt and water is removed from the system.

Figure 7:
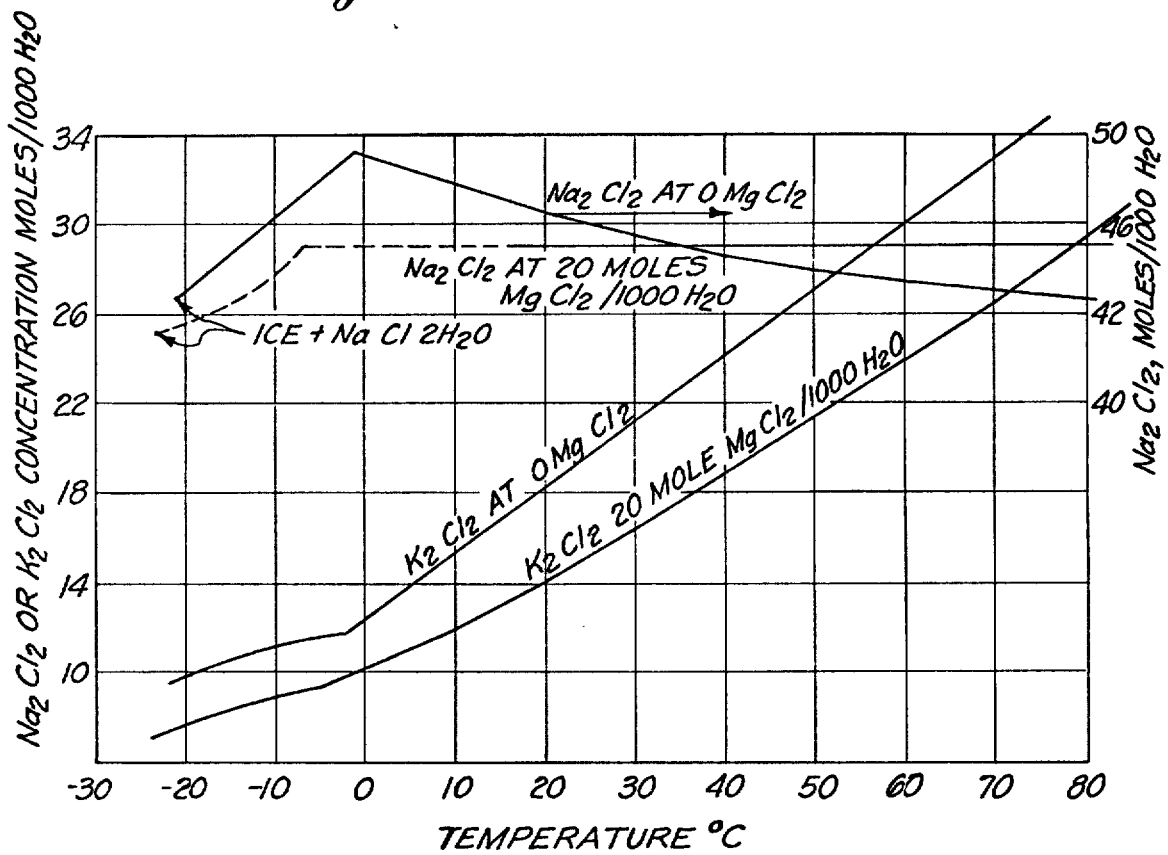
FIG. 7 is a chart depicting the relationship of temperature versus sodium and potassium chloride saturation limits at various magnesium chloride concentrations.

The recovery of potassium chloride per unit of dissolving brine for various operating conditions is shown in Table I. Also shown is the potassium chloride loss resulting from discarding the cold brine to reject sodium chloride. The advantage of low temperature operation is apparent in Table I. The advantage of magnesium chloride is seen in FIG. 7 where at a concentration of about 20 moles of magnesium chloride, per 1,000 moles of water, the solubility of sodium chloride remains essentially constant between about 80°C. and about −8°C. A brine containing this concentration of magnesium chloride ($MgCl_2$) does not dissolve sodium chloride from the ore body, thereby eliminating both the need to reject sodium chloride during the crystallization and cooling operations, and the concurrent loss of potassium chloride from the operation.

TABLE I

POTASH LOSS* UPON DISCARDING COOLED SOLUTION
All concentrations in moles per 1,000 moles of water

| Cold Temp., °F | Hot Temp. = 135°F ($Na_2Cl_2$ 43.7 or 29.0 at 20 $MgCl_2$) | | | | | | 113°F ($Na_2Cl_2$ 44.4 or 29.0 at 20 $MgCl_2$) | | | |
|---|---|---|---|---|---|---|---|---|---|---|
| | $K_2Cl_2$ Concn. | | $\Delta K_2Cl_2$ | | %KCl Loss* | | $\Delta K_2Cl_2$ | | %KCl Loss* | |
| | ($Na_2Cl_2$) 29.4 0$MgCl_2$ | 23.2 20$MgCl_2$ | 0$MgCl_2$ | 20$MgCl_2$ | 0$MgCl_2$ | 20$MgCl_2$ | ($Na_2Cl_2$) 25.8–20.2 0$MgCl_2$ | 20$MgCl_2$ | 0$MgCl_2$ | 20$MgCl_2$ |
| 30 | 21.2 | 16.4 | 8.2 | 6.8 | 16.2 | 18.8 | 4.6 | 3.8 | 16.0 | 18.8 |
| 20 | 18.3 | 13.9 | 11.1 | 9.3 | 14.0 | 16.0 | 6.5 | 6.3 | 13.8 | 16.0 |
| 10 | 15.2 | 11.7 | 14.2 | 11.5 | 11.6 | 13.5 | 10.6 | 8.5 | 11.4 | 13.5 |
| 0 | 12.4 | 10.0 | 17.0 | 13.2 | 10.0 | 11.5 | 13.4 | 10.2 | 9.3 | 11.5 |
| −10 | 11.1 | 8.4 | 18.3 | 14.8 | 8.5 | 9.7 | 14.7 | 11.8 | 8.3 | 9.7 |

*for 33.3% salt bleed

EXAMPLE III

A brine, withdrawn from well 44 is essentially saturated with potassium chloride and sodium chloride at a temperature of 130°F. It is processed while the ambient air temperature is about 0°F. in the apparatus described above and illustrated in FIG. 4.

In the second crystallizer station $B_2$, rich brine enters at 130°F., and brine is circulated through the tubes in heat exchanger 74 by the pumps 78. Processed brine at a temperature of 110°F., is pumped through the shell side of the exchanger. The brine being processed is maintained at a temperature of 120°F. in the first of five chambers in crystallizer 54 and potassium chloride is crystallized from the rich brine. The same process takes place in each of the five crystallizer chambers or bodies, with typical temperatures shown in Table II.

Table II

| Body No. | Rich Brine Entering, °F. | Crystallizing Station | | Cool Brine entering Exchange Tank,°F. |
|---|---|---|---|---|
| | | Crystallizing Brine in Body, °F. | Exchange Brine Tank temp., °F. | |
| 1 | 130 | 120 | 110 | 100 |
| 2 | 120 | 110 | 100 | 90 |
| 3 | 110 | 100 | 90 | 80 |
| 4 | 100 | 90 | 80 | 70 |

Table II-continued

| Body No. | Rich Brine Entering, °F. | Crystallizing Station | | Cool Brine entering Exchange Tank, °F. |
| --- | --- | --- | --- | --- |
| | | Crystallizing Brine in Body, °F. | Exchange Brine Tank temp., °F. | |
| 5 | 90 | 80 | 70 | 60 |

The rich brine slurry from the first body is advanced to the second body, slurry from the second body goes to the third, and so on. The cooler exchange brine circulated in the fifth body advances to the brine tank for the fourth body and so on, countercurrent to the flow of rich brine.

The rich brine slurry leaving the last chamber or body at 80°F is taken to the first body of the next multiple body unit which is equipped with external heat exchangers, as shown in FIGS. 2–3. The brine is circulated through the draft tube and crystallizer body by the impeller in the body. Some rich brine slurry is continuously withdrawn and pumped through the tubes of the external heat exchanger where it is cooled by exchange with cooler depleted brine, and then readmitted to the crystallizer at or near the eye of the impeller.

Rich brine slurry in the first body is maintained at 70°F. by exchange with cooler brine at 60°F., so that incoming brine slurry is cooled from 80°F. to 70°F. thereby crystallizing potassium chloride from the brine. Temperatures for the five bodies are shown in Table III.

Table III

| Body No. | Rich Brine Entering, °F. | Crystallizing Station | | Cool Brine Entering Exchange Tank, °F. |
| --- | --- | --- | --- | --- |
| | | Crystallizing Brine in Body, °F. | Exchange Brine Tank Temp., °F. | |
| 6 | 80 | 70 | 60 | 50 |
| 7 | 70 | 60 | 50 | 40 |
| 8 | 60 | 50 | 40 | 30 |
| 9 | 50 | 40 | 30 | 20 |
| 10 | 40 | 30 | 20 | 10 |

The third multiple body unit is equipped with atmospheric coolers, as shown in FIGS. 4–5, with rich brine slurry entering the first body at 30°F. The slurry in the first body is maintained at 26°F. by pumping brine slurry from the crystallizer through the cooling tower above the crystallizer and returned to the crystallizer body. Brine slurry at 26°F. also goes to the second body where brine slurry is maintained at 22°F. by air cooling in its cooling tower.

Temperatures for all stages are shown in Table IV.

Table IV

| Body No. | Crystallizing Station | | Cooling Air, °F. |
| --- | --- | --- | --- |
| | Rich Brine Entering, °F. | Crystallizing Brine in Body, °F. | |
| 11 | 30 | 26 | 0 |
| 12 | 26 | 22 | 0 |
| 13 | 22 | 18 | 0 |
| 14 | 18 | 14 | 0 |
| 15 | 14 | 10 | 0 |

The brine slurry removed from the last stage is separated into solid potassium chloride product and a depleted brine by the process centrifuge, and the depleted brine, at 10°F. is the brine entering the exchange tank of crystallizer body No. 10.

EXAMPLE IV

With the same operating arrangement as Example III, the air temperature changed from 0°F. to 10°F. due to daytime warming. With this air temperature the brine temperature in crystallizer body No. 15 is maintained at 20°F. and the temperatures of all stages are adjusted accordingly. Adjusted temperatures are shown in Table V.

Table V

| Body No. | Rich Brine Entering, °F. | Crystallizing Brine in Body, °F. | Exchange Brine Tank Temp., °F. | Cool Brine Entering Exchange Tank, °F. |
| --- | --- | --- | --- | --- |
| 1 | 130 | 121 | 111 | 102 |
| 2 | 121 | 112 | 102 | 93 |
| 3 | 112 | 103 | 93 | 84 |
| 4 | 103 | 94 | 84 | 75 |
| 5 | 94 | 85 | 75 | 66 |
| 6 | 85 | 76 | 66 | 57 |
| 7 | 76 | 67 | 57 | 48 |
| 8 | 67 | 58 | 48 | 39 |
| 9 | 58 | 49 | 39 | 30 |
| 10 | 49 | 40 | 30 | 20 |
| | | | Cooling Air, °F | |
| 11 | 40 | 36 | 10 | |
| 12 | 36 | 32 | 10 | |
| 13 | 32 | 28 | 10 | |
| 14 | 28 | 24 | 10 | |
| 15 | 24 | 20 | 10 | |

It may be appreciated that, in using an atmospheric crystallizer warmer or cooler air temperatures require corresponding adjustments in operating conditions, but that with the necessary adjustments, any air temperature, provided it is lower than the rich bring temperature, may be utilized in the process. When a refrigerative crystallizer is employed, however, the cooling operation can be carried out according to any set range of temperatures, especially favorable results being obtainable from use of temperatures within the listed ranges.

What is claimed is:

1. An apparatus for crystallizing potassium chloride from a solution of potassium chloride and sodium chloride comprising:

a. a housing including a plurality of substantially vertical, transverse partitions defining a plurality of cooling chambers including end chambers for serial passage of the solution therethrough, each cooling chamber including a downwardly inwardly inclined drip pan in the lower portion thereof to define an upper cooling zone and a lower cooling zone below said drip pan, a flow passageway in the apex of said drip pan connecting said upper cooling and said lower zones, the sides of said housing and the transverse partitions being air-premeable above said drip pan and solid below said drip pan;

b. a plurality of fixed vertically staggered inclined baffle elements disposed within the cooling chambers above said drip pans and over which the solution is passed;

c. means for inducing forced air flow at a temperature substantially lower than that of the solution, through the air permeable walls upwardly and out through an exhaust above said chambers such that cooling of the solution occurs by sensible heat exchange with the air;

d. at least one crystallizing receptacle disposed within the lower cooling zone of each chamber for receiving the cooled solution from the upper cooling zone and wherein controlled crystal growth of potassium chloride occurs on a seed bed of potassium chloride crystals contained in a slurry, said crystallizing receptacles being substantially isolated from contact with the flow of air through said cooling zones;

e. valve passageways disposed at the lower ends of the vertical partitions connecting said lower zones for serial flow of said slurry therethrough;

f. solution inlet in one said end chamber and slurry outlet in the other end chamber;

g. a plurality of spray nozzles above the baffle elements of each cooling chamber for directing the flow of solution over the baffles; and h. conduit means including pump means associated with each chamber for passing solution from the crystallizing receptacles to said spray nozzles.

2. An apparatus for crystallizing potassium chloride from a solution of potassium chloride and sodium chloride, at a temperature below about 35°F, which comprises a. a housing containing:
  1. a plurality of substantially vertical, transverse baffles dividing said housing into a plurality of chambers, each chamber including a downwardly inclined drip pan in the lower portion thereof, said drip pan dividing said chamber into an upright, upper cooling chamber and a lower zone, a flow passage at the apex of said drip pan connecting the cooling chamber to the lower zone, the substantially baffles and the sides of said housing being air-permeable above said drip pan and solid below, the air-permeable walls permitting a uniform flow of air to enter each of said chambers;
  2. a multiplicity of crystallizing receptacles, at least one in each of said lower zones for promoting growth of large crystals, each receptacle being disposed below an upper cooling chamber for receiving the cooled solution and isolating the received cooled solution from contact with said flow of air; and
  3. an air-exhaust outlet located above the cooling chambers;

b. a plurality of vertically staggered, inclined fixed baffles disposed within each cooling chamber and arranged such that solution can flow by gravity over the baffles;

c. a plurality of spray nozzles, located at the top of each cooling chamber, said spray nozzles directing the flow of the solution onto and over said baffles;

d. an exhaust fan located in the air-exhaust outlet for inducing the upward flow of air through the cooling chambers and out the exhaust outlet in countercurrent flow to a descending flow of solution;

e. an inner baffle located within each crystallizing receptacle to provide an actively circulating heavy slurry zone and a quiet settling zone;

f. an impeller positioned with each inner baffle of each crystallizing receptacle for inducing flow of solution upwardly within the inner baffle and outwardly over the top and back to the bottom of the chamber; and g. a conduit including pump means located within each crystallizing receptacle for passing solution from the crystallizing receptacle to the spray nozzles;

h. valve means positioned in the lower ends of each vertical portion connecting said lower zones for serial flow of slurry therethrough; and i. solution inlet in one of said end chambers and slurry outlet in the other end chamber.

3. An apparatus for crystallizing potassium chloride from a solution of potassium chloride and sodium chloride at a temperature below about 35°F, which comprises:

a. a heat exchange crystallizer for cooling and partially crystallizing potassium chloride, which comprises:
  i. a housing having an inlet and outlet and containing a plurality of crystallizing chambers for the initial reception of the solution;
  ii. heat exchangers disposed in operable relation with the crystallizing chambers, each having a number of inner tubes defining a passage for the potassium chloride solution, and an outer shell surrounding the tubes, which defines a path for the circulation of a cooling fluid;
  iii. means for drawing the solution from each crystallizing chamber through the inner tubes of the heat exchanger, in indirect heat transfer relation to the fluid within the shell, and back into the crystallizing chamber; and
  iv. means for drawing cooling fluid through the shell; and b. an atmospheric crystallizer which comprises:
  i. a housing including a plurality of substantially vertical, transverse partitions defining a plurality of cooling chambers including end chambers for serial passage of the solution, therethrough, each cooling chamber including a downwardly inwardly inclined drip pan in the lower portion thereof to define an upper cooling zone and a lower cooling zone below said drip pan, a flow passageway in the apex of said drip pan connecting said upper cooling and said lower zones, the sides of said housing and the transverse partitions being air-permeable above said drip pan and solid below said drip pan;
  ii. a plurality of fixed vertically staggered, inclined baffle elements disposed within the cooling chambers above said drip pans and over which the solution is passed;
  iii. a plurality of spray nozzles lcoated at the top of each cooling chamber and through which solution is directed onto the fixed baffles and downwardly through the cooling chamber;
  iv. means for inducing forced air flow at a temperature substantially lower than that of the solution through the airpermeable walls upwardly and out through an exhaust above said chambers such that cooling of the solution occurs by sensible heat exchange with air; and
  v. at least one crystallizing receptacle disposed within the lower cooling zone of each chamber for receiving the cooled solution from the upper cooling zone and wherein controlled crystal growth of potassium chloride occurs on a seed bed of potassium chloride crystals contained in a slurry, said crystallizing receptacles being substantially isolated from contact with the flow of air through said cooling zones;

vi. valve passageways disposed at the lower ends of the vertical partitions connecting said lower zones for serial of said slurry therethrough;

vii. solution inlet in one said end chamber and slurry outlet in the other end chamber;

viii. a plurality of spray nozzles above the baffle elements of each cooling chamber for directing the flow of solution over the baffles; and ix. conduit means including pump means associated with each chamber for passing solution from the crystallizing receptacles to said spray nozzles;

c. means for passing the potassium chloride solution from the outlet of the heat exchange crystallizer into the solution inlet of the atmospheric crystallizer.

4. An apparatus for promoting potassium chloride crystal growth in a slurry of potassium chloride crystals contained in a solution of potassium chloride and sodium chloride comprising:

a. a housing including a plurality of substantially vertical, transverse partitions defining a plurality of cooling chambers including end chambers for serial passage of the solution therethrough, each cooling chamber including a downwardly inwardly inclined drip pan in the lower portion thereof to define an upper cooling zone and a lower cooling zone below said drip pan, a flow passageway in the apex of said drip pan connecting said upper cooling and said lower zones, the sides of said housing and the transverse partitions being air-permeable above said drip pan and solid below said drip pan;

b. a plurality of fixed vertically staggered, inclined baffle elements disposed within the cooling chambers above said drip pans and over which the solution is passed;

c. an exhaust fan positioned above said chambers for inducing forced air flow at a temperature substantially lower than that of the slurry, through the air permeable walls and upwardly through the cooling chambers such that cooling of the slurry occurs by sensible heat exchange with the air;

d. at least one crystallizing receptacle disposed within the lower cooling zone of each chamber for receiving the cooled solution from the upper cooling zone and wherein controlled crystal growth of potassium chloride occurs on a seed bed of potassium chloride crystals contained in a slurry, said crystallizing receptacles being substantially isolated from contact with the flow of air through said cooling zones;

e. valved passageways disposed at the lower ends of the vertical partitions connecting said lower zones for serial of said slurry therethrough;

f. solution inlet in one said end chamber and slurry outlet in the other end chamber;

g. a plurality of spray nozzles above the baffle elements of each cooling chamber for directing the flow of solution over the baffles; and h. conduit means including pump means associated with each chamber for passing solution from the crystallizing receptacles to said spray nozzles.

5. An apparatus for promoting potassium chloride crystal growth in a slurry of potassium chloride crystals contained in a solution of potassium chloride and sodium chloride, at a temperature below about 35°F, which comprises:

a. a housing containing:

i. a plurality substantially vertical, transverse baffles dividing said housing into a plurality of chambers, each chamber including a downwardly inclined drip pan in the lower portion thereof, said drip pan dividing said chamber into an upright, upper cooling chamber and a lower zone, a flow passage at the apex of said drip pan connecting the cooling chamber to the lower zone, the substantially verticle baffles and the sides of said housing being air-permeable above said drip pan and solid below, the air-permeable walls permitting a uniform flow of air to enter each of said chambers;

ii. a multiplicity of crystallizing receptacles formed in part by the air-permeable portions of the substantially vertical baffles in the lower zones for promoting growth of large crystals of potassium chloride, each receptacle being disposed below an upper cooling chamber for receiving the cooled slurry and isolating the received cooled slurry from contact with said flow of air; and iii. an air-exhaust outlet located above the cooling chambers;

b. a plurality of vertically staggered, inclined fixed baffles disposed within each cooling chamber and arranged such that solution can flow by gravity over the baffles;

c. a plurality of spray nozzles, located at the top of each cooling chamber, said spray nozzles directing the flow of the slurry onto and over the baffles;

d. an exhaust fan located in the air-exhaust outlet for inducing the upward flow of air through the cooling chambers and out the exhaust outlet;

e. an inner baffle located within each crystallizing receptacle to provide an actively circulating heavy slurry zone and a quiet settling zone for crystals of potassium chloride;

f. an impeller positioned within each inner baffle of each crystallizing receptacle for inducing flow of solution upwardly within the inner baffle and outwardly over the top and back to the bottom of the chamber; and g. a conduit including pump means located within each crystallizing receptacle for passing solution from the crystallizing receptacle to the spray nozzles;

h. valve means positioned in the lower ends of each vertical portion connecting said lower zones for serial flow of slurry therethrough; and i. solution inlet in one of said end chambers and slurry outlet in the other end chamber.

6. An apparatus for promoting potassium chloride crystal growth in a slurry of potassium chloride crystals contained in a solution of potassium chloride and sodium chloride at a temperature below about 35°F, which comprises in combination:

a. a heat exchange crystallizer for cooling and partially crystallizing potassium chloride for a slurry of potassium chloride crystals which comprises:

i. a housing having an inlet and outlet and containing a plurality of crystallizing chambers for the initial reception of the solution;

ii. heat exchangers disposed in operable relation with the crystallizing chambers, each having a number of inner tubes defining a passage for a potassium chloride solution, and an outer shell surrounding the tubes, which defines a path for the circulation of a cooling fluid;

iii. means for drawing the potassium chloride solution from each crystallizing chamber through the inner tubes of the heat exchanger, in indirect heat transfer relation to the fluid within the shell, and back into the crystallizing chamber; and
iv. means for drawing cooling fluid through the shell; and b. an atmospheric crystallizer for promoting growth of potassium crystal growth in the formed slurry which comprises:

i. a plurality substantially vertical, transverse baffles dividing said housing into a plurality of chambers, each chamber including a downwardly inclined drip pan in the lower portion thereof, said drip pan dividing said chamber into an upright, upper cooling chamber and a lower zone, a flow passage at the apex of said drip pan connecting the cooling chamber to the lower zone, the substantially vertical baffles and the sides of said housing being air-permeable above said drip pan and solid below, the air-permeable walls permitting a uniform flow of air to enter each of said chambers;

ii. a multiplicity of crystallizing receptacles, at least one in each of said lower zones for promoting growth of large crystals, each receptacle being disposed below an upper cooling chamber for receiving the cooled solution and isolating the received cooled solution from contact with said flow of air; and iii. an air-exhaust outlet located above the cooling chambers;

iv. a plurality of vertically staggered, inclined fixed baffles disposed within each cooling chamber and arranged such that solution can flow by gravity over the baffles;

v. a plurality of spray nozzles located at the top of each cooling chamber and through which the slurry is directed onto the fixed baffles and downwardly through the cooling chamber;

vi. means for inducing forced air flow through the air-permeable walls and upwardly through the cooling chamber and to an exhaust outlet;

vii. an inner baffle located within each crystallizing receptacle to provide an actively circulating heavy slurry zone and a quiet settling zone;

viii. an impeller positioned within each inner baffle of each crystallizing receptacle for inducing flow of solution upwardly within the inner baffle and outwardly over the top and back to the bottom of the chamber; and ix. a conduit including pump means located within each crystallizing receptacle for passing solution from the crystallizing receptacle to the spray nozzles;

x. valve means positioned in the lower ends of each vertical portion connecting said lower zones for serial flow of slurry therethrough; and xi. solution inlet in one of said end chambers and slurry outlet in the other end chamber;

c. means for passing the initially formed potassium chloride slurry from the outlet of the heat exchange crystallizer into the solution inlet atmospheric crystallizer.

* * * * *

UNITED STATES PATENT AND TRADEMARK OFFICE
CERTIFICATE OF CORRECTION

PATENT NO. : 3,918,916
DATED : November 11, 1975
INVENTOR(S) : Donald E. Garrett It is certified that error appears in the above-identified patent and that said Letters Patent are hereby corrected as shown below:

Column 1, line 42, "potassiumrich" should read --potassium rich--.

Column 9, line 16, "NaCl2H$_2$O" should read --NaCl·2H$_2$O--.

Column 10, line 15, "the" second occurrence should read --that--.

Column 11, line 55, "Bring" should read --Brine--.

Column 13, line 24, "exchanger" should read --exchange--.

Column 13, line 26, "changer" should read --change--.

Column 18, line 57, "premeable" should read --permeable--.

Column 19, line 34, after "substantially" insert -- vertical --.

Column 19, line 62, "with" should read --within--.

Column 20, line 50, "1coated" should read --located--.

Signed and Sealed this

Third Day of August 1976

[SEAL]

Attest:

RUTH C. MASON
*Attesting Officer*

C. MARSHALL DANN
*Commissioner of Patents and Trademarks*